E. NEUKOMM.
VALVE TRIP GEAR FOR STEAM AND OTHER MOTIVE POWER ENGINES.
APPLICATION FILED MAR. 7, 1910.
1,005,741.
Patented Oct. 10, 1911.
3 SHEETS—SHEET 1.
Fig. 1.
Fig. 2.
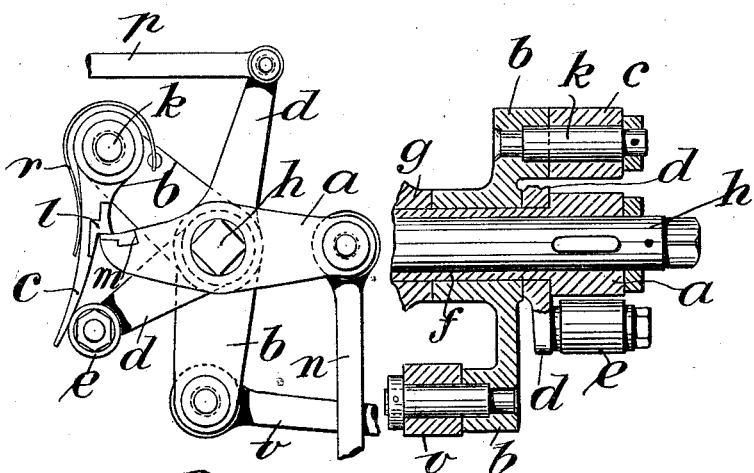
Fig. 3.
Fig. 4.
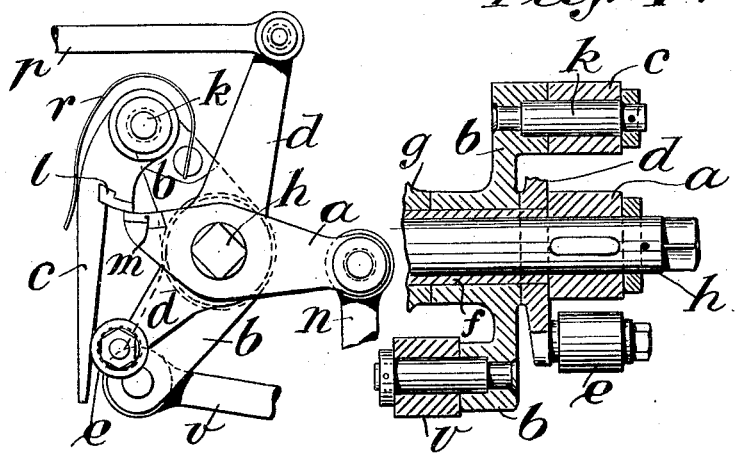
Witnesses.
N. Meem
Annie N. Butler
Inventor.
Edwin Neukomm.
Per Mason Fenwick & Lawrence,
Attorneys.

E. NEUKOMM.
VALVE TRIP GEAR FOR STEAM AND OTHER MOTIVE POWER ENGINES.
APPLICATION FILED MAR. 7, 1910.
1,005,741.
Patented Oct. 10, 1911.
3 SHEETS—SHEET 2.
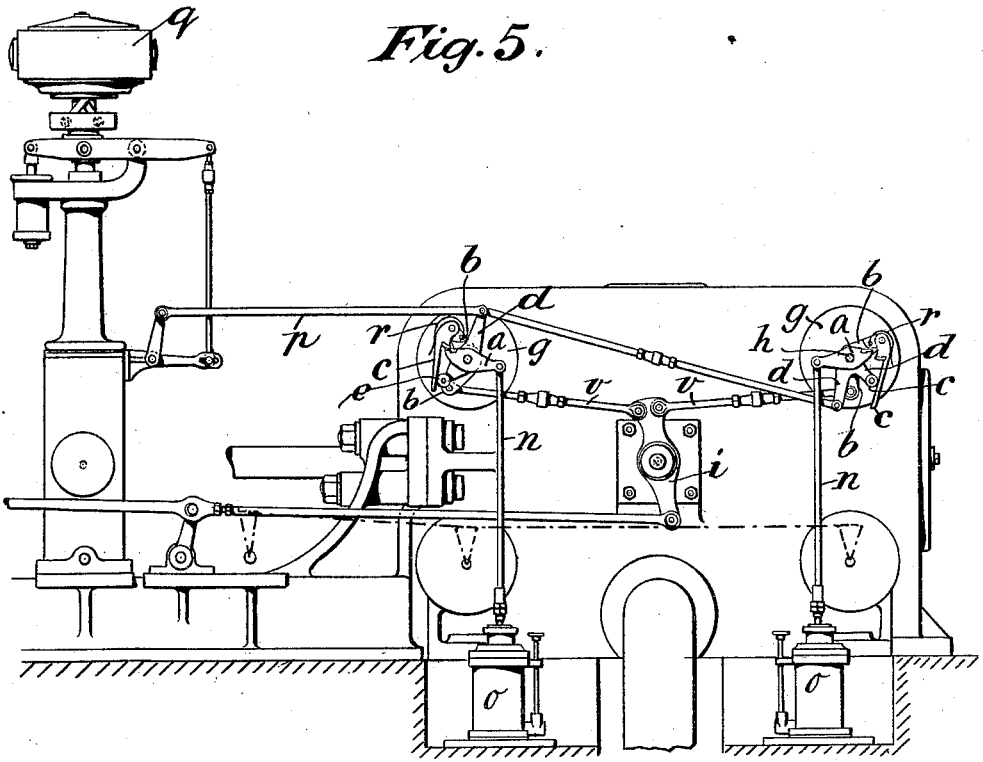
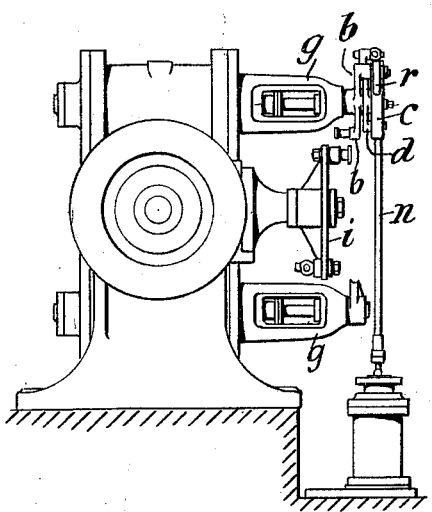
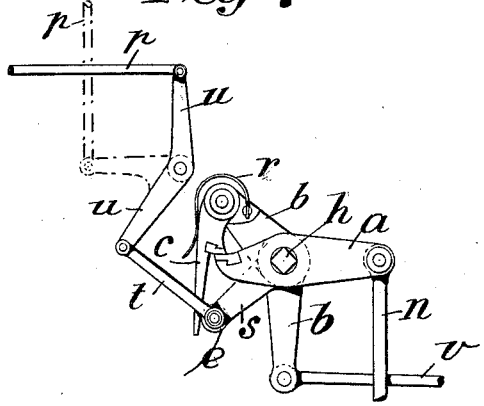
Witnesses.
Inventor.
Edwin Neukomm.
per Malm, Murick & Lawrence
Attorneys.

E. NEUKOMM.
VALVE TRIP GEAR FOR STEAM AND OTHER MOTIVE POWER ENGINES.
APPLICATION FILED MAR. 7, 1910.
1,005,741.
Patented Oct. 10, 1911.
3 SHEETS—SHEET 3.
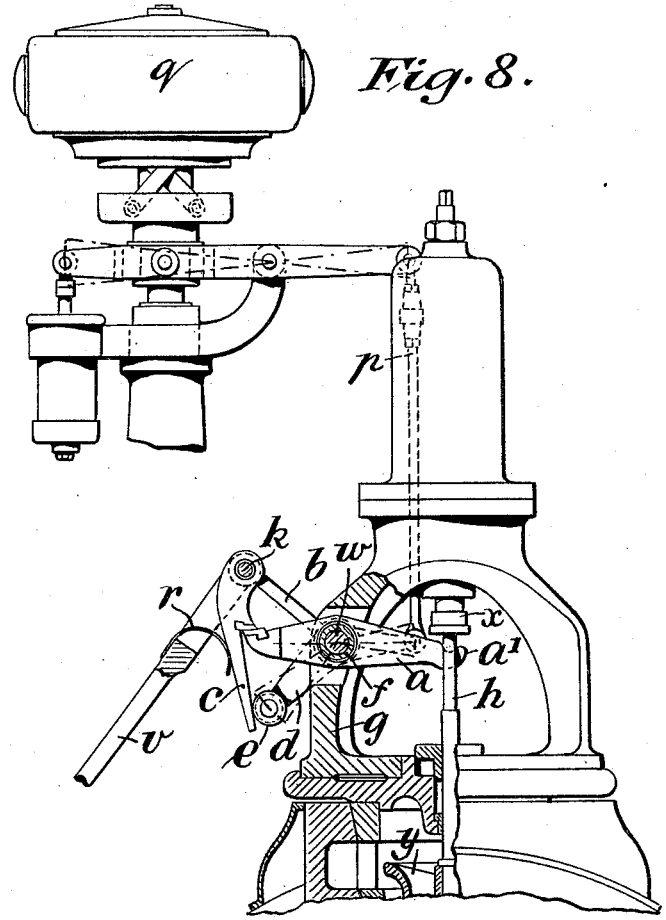
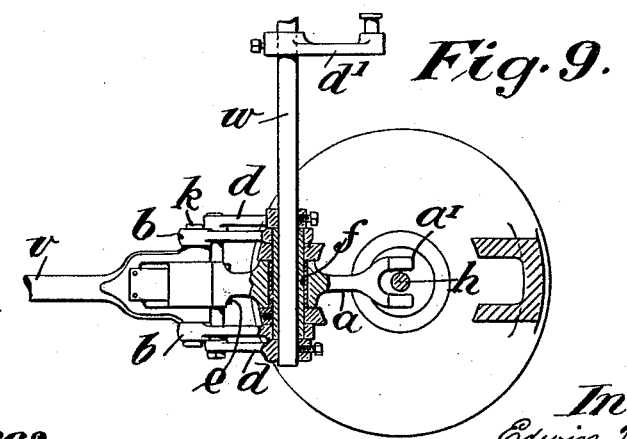
Witnesses.
N. Meem
Annie N. Butler
Inventor.
Edwin Neukomm.
Per Mason Fenwick & Lawrence,
Attorneys

UNITED STATES PATENT OFFICE.

EDWIN NEUKOMM, OF ROCHDALE, ENGLAND.

VALVE TRIP-GEAR FOR STEAM AND OTHER MOTIVE-POWER ENGINES.

1,005,741. Specification of Letters Patent. Patented Oct. 10, 1911.

Application filed March 7, 1910. Serial No. 547,896.

*To all whom it may concern:*

Be it known that I, EDWIN NEUKOMM, citizen of Switzerland, residing at Rochdale, in the county of Lancaster, Kingdom of Great Britain, have invented new and useful Improvements in and Connected with Valve Trip-Gears for Steam and other Motive-Power Engines, of which the following is a specification.

This invention has for its object to provide an improved construction and arrangement of trip-gear applicable for Corliss, drop and other types of valves of steam and other motive power engines, whereby the engagement of the valve lever is rendered positive, the friction and consequent plucking action on the governor at release reduced to a minimum while the governor has to perform less work, the steam or other fluid can be instantly cut off at any part of the stroke, the gear is rendered much simpler and lighter and the inertia will be consequently diminished and the gear actuating positively, slipping is prevented and the engine can be run at a relatively higher speed. To prevent the said slipping, according to my invention I dispense with the said flat contact surfaces which being flat had to be very short and provide the said trip catch and valve lever each with a long and curved contact surface overlapping each other, say about 1¼ to 1½ inch and forming an arc with center coinciding with the fulcrum of the trip catch from which it is suspended.

To diminish the plucking action on the governor at the moment of the disengagement of the trip catch from the valve lever, I arrange the trip gear in such a manner, as to effect the displacement of the trip catch from the valve lever more uniformly and during the whole period the trip catch and valve lever are engaged, whereby the governor not only determines the time the contact surface of the trip catch and valve lever are in engagement, but also controls the amount of the contact surfaces in engagement according to the different cut offs. To further reduce the work on the governor which by my improvements so far described is now rendered more constant, I provide the trip catch with a tail end, giving a great amount of leverage for the governor to act upon and I also furnish the said governor lever on its end with a roller in contact with the said tail end whereby friction is reduced to a minimum and to render the movement of the trip catch uniform and in proportion to the motion of the governor. I arrange the fulcrum of the governor lever to coincide with the fulcrum of the valve lever whereby the movement of the governor lever roller in contact with the trip catch tail end is most direct and regular, the outward movement of the trip catch being approximately equal to the movement of the roller on the arc with center coinciding with the fulcrum of the valve lever.

I attain these objects by the mechanism illustrated in the accompanying three sheets of drawings, in which—

Figures 1 and 3 are detached side views and Figs. 2 and 4 respectively longitudinal sections of a trip-gear constructed in accordance with the invention. Figs. 5 and 6 are respectively a side elevation and an end view of a Corliss engine provided with the improved trip-gear, and Fig. 7 a detached side view of a modified application thereof. Fig. 8 is an end view partly in section and Fig. 9 a sectional plan of an engine with drop valves provided with the improved valve trip-gear.

Similar letters refer to similar parts throughout the several views.

In carrying out the invention and referring to the figures generally, the improved valve trip-gear consists chiefly of a valve lever $a$, a rocking lever $b$, a trip-catch $c$ and a governor lever $d$ carrying a loose roller $e$.

Referring more particularly to Figs. 1, 2, 3 and 4, the rocking lever $b$ moves on a bush $f$ which is firmly secured into the valve spindle bonnet $g$ and serves as a bearing for the valve spindle $h$. The rocking lever $b$ is moved by a rod $v$ from a wrist plate $i$, Figs. 5 and 6, and an eccentric (not shown) in the usual manner and transmits its motion to the trip-catch $c$ which by a stud $k$ is suspended from the rocking lever $b$. The trip-catch $c$ as well as the valve lever $a$, which latter is firmly secured to the outer end of the valve spindle $h$, are each provided with a steel plate $l$, $m$ respectively serving as contact surface the former forming a shoulder to rest upon the latter. The said contact surfaces form portions of a joint arc with center coinciding with that of the fulcrum $k$ of the trip-catch $c$.

The valve lever $a$ by a rod $n$, Figs. 5 and 6, is connected with the piston of a dash pot $o$ and actuates the valve.

Upon the free end of the bush $f$ is adapted to oscillate the governor lever $d$, one end of which, by a rod $p$ and other suitable connections, say such as shown, is coupled with the governor $q$ and the other furnished with a loose roller $e$.

The trip-catch $c$ is fixed in such a position relative to the valve lever $a$, that it readily engages therewith without shock and such engagement is rendered positive by means of a suitable spring connection or weight, say by a plate spring $r$ secured to the rocking lever $b$ which keeps the tail end of the trip-catch $c$ always in contact with the loose roller $e$ on the said governor lever $d$ and hence prevents slipping.

The tail end of the trip-catch $c$ may be curved as shown in Fig. 1, the respective curve being not a regular curve but obtained by setting out various positions whereby the trip-catch is caused to disengage the valve lever $a$ gradually and a gradual rolling motion is obtained which reduces the friction between the trip-catch $c$ and the loose roller $e$ on the governor lever to a minimum and prevents any shocks being transmitted by the governor lever $d$ to the governor, or in some cases the said trip catch tail end may be formed straight as shown in Fig. 3.

The trip-catch $c$ releases the valve lever $a$ by the loose roller $e$ on the governor lever $d$ in contact with the tail end of the trip-catch $c$, moving the trip-catch out of contact with the valve lever $a$. Any fluctuation in the speed of the engine is accompanied by an alteration in the position of the said loose roller which renders the contact of the trip-catch $c$ with the valve lever $a$ of longer or shorter duration. The valve lever $a$ can be released at any part of the stroke.

The valve lever end operated upon by the trip-catch $c$ is of such a length and the loose roller $e$ on the governor lever $d$ so situated in relation thereto that when the latter moves, its roller clears the valve lever end, whereby the point of contact of the loose roller $e$ with the trip-catch $c$ is brought as far away from the fulcrum $k$ of the trip-catch as possible which gives greater leverage and hence materially assists the work of the governor.

The gear described operates as follows:—
By means of the eccentric aforesaid, the rocking lever $b$, is continuously oscillated and the trip-catch $c$ carried thereby depresses the valve lever $a$ and thus opens the valve against the resistance of the dash pot $o$. At the same time the tail end of the trip-catch $c$ is in contact with the loose roller $e$ on the governor lever $d$ and forced down on the loose roller $e$ and the trip-catch $c$ thereby caused to release the valve lever $a$, when the dash pot $o$ immediately closes the valve again and the rocking lever $b$ continuing its oscillation, the spring $r$ forces the trip-catch $c$ into engagement again which completes the cycle of operation.

Referring to Fig. 7, according to a modification of this invention, in lieu of the governor lever described, an arm $s$ carrying a loose roller $e$ may be fulcrumed to the valve bonnet bush $f$ and by a rod and angular lever $u$ connected to the rod $p$ leading to the governor.

Referring to Figs. 8 and 9, in this case the valve lever $a$ is mounted loosely upon a bush $f$ employed around the shaft $w$ and secured to the bonnet $g$, the said bush forming a bearing for the shaft $w$. The valve lever $a$ has a forked end $a'$ upon which rests a collar $x$ secured to the spindle $h$ of the drop valve $y$. At each end of the bush $f$ is secured to the shaft $w$ the arm $d$ carrying on a pin the loose roller $e$. Upon each end of the bush $f$ is loosely mounted a rocking arm $b$ connected together by a pin $k$ to which is fulcrumed the trip-catch $c$ and also the eccentric rod $v$. To the shaft $w$ is also secured an arm $d'$ by a rod $p$ connected with the governor $q$.

I claim:

1. In a valve trip gear for steam and other motive power engines, a valve lever, a rocking lever, a governor lever and suspended from the said rocking lever a trip catch furnished with a contact surface situated above the free end of and adapted to depress the said valve lever, the said governor lever carrying a roller adapted to operate upon the tail end of the said trip catch and having a fulcrum coinciding with that of the said valve lever and rocking lever and so located in relation to the said trip catch tail end, that the least motion of the governor lever imparts to the trip catch a comparatively large and regular engaging movement which permits of varying the amount of contact surface presented by the trip catch and valve lever according to the cut off in the cylinder, proportionately to the movement of the governor, substantially as and for the purpose set forth.

2. In a valve trip gear for steam and other motive power engines, a valve lever, a rocking lever, a governor lever and suspended from the said rocking lever a trip catch furnished with a contact surface situated above the free end of and adapted to depress the said valve lever, the said governor lever carrying a roller adapted to operate upon the tail end of the said trip catch and having a fulcrum coinciding with that of the said valve lever and rocking lever, the said trip catch and the valve lever contact surfaces being curved and forming an arc the center of which coincides with the fulcrum of the said trip catch and the said contact surfaces of such a length that a positive engagement is insured, slipping prevented and wear and tear reduced to a minimum, all substantially as set forth.

3. In a valve trip gear for steam and other motive power engines, a valve lever, a rocking lever, a governor lever and suspended from the said rocking lever a trip catch furnished with a contact surface situated above the free end of and adapted to depress the said valve lever, the said governor lever carrying a roller adapted to operate upon the tail end of the said trip catch and having a fulcrum coinciding with that of the said valve lever and rocking lever, the said trip catch tail end being of such a length and the said governor lever roller so situated in relation to the said tail end, as to reduce the governor force required for disengaging the trip catch to a minimum, all substantially as set forth.

4. In a valve trip gear for steam and other motive power engines, a valve lever, a rocking lever, a governor lever and suspended from the said rocking lever a trip catch furnished with a contact surface situated above the free end of and adapted to depress the said valve lever, the said governor lever carrying a roller adapted to operate upon the tail end of the said trip catch and having a fulcrum coinciding with that of the said valve lever and rocking lever, the said trip catch tail end being so situated in relation to the said governor lever roller, the fulcrum of the said governor lever and the contact surface of the said trip catch in engagement with the contact surface of the said valve lever, that the disengagement of the trip catch from the valve lever begins the moment the engagement of the trip catch contact surface with the valve lever takes place and during the whole period a gradual and uniform disengaging is insured and thereby the plucking action on the governor during disengagement is reduced to a minimum, all substantially as set forth.

In testimony whereof I have signed my name to this specification in the presence of two subscribing witnesses.

EDWIN NEUKOMM.

Witnesses:
  FERDINAND BOSSHARDT,
  STANLEY E. BRAMALL.

---

Copies of this patent may be obtained for five cents each, by addressing the "Commissioner of Patents, Washington, D. C."